UNITED STATES PATENT OFFICE.

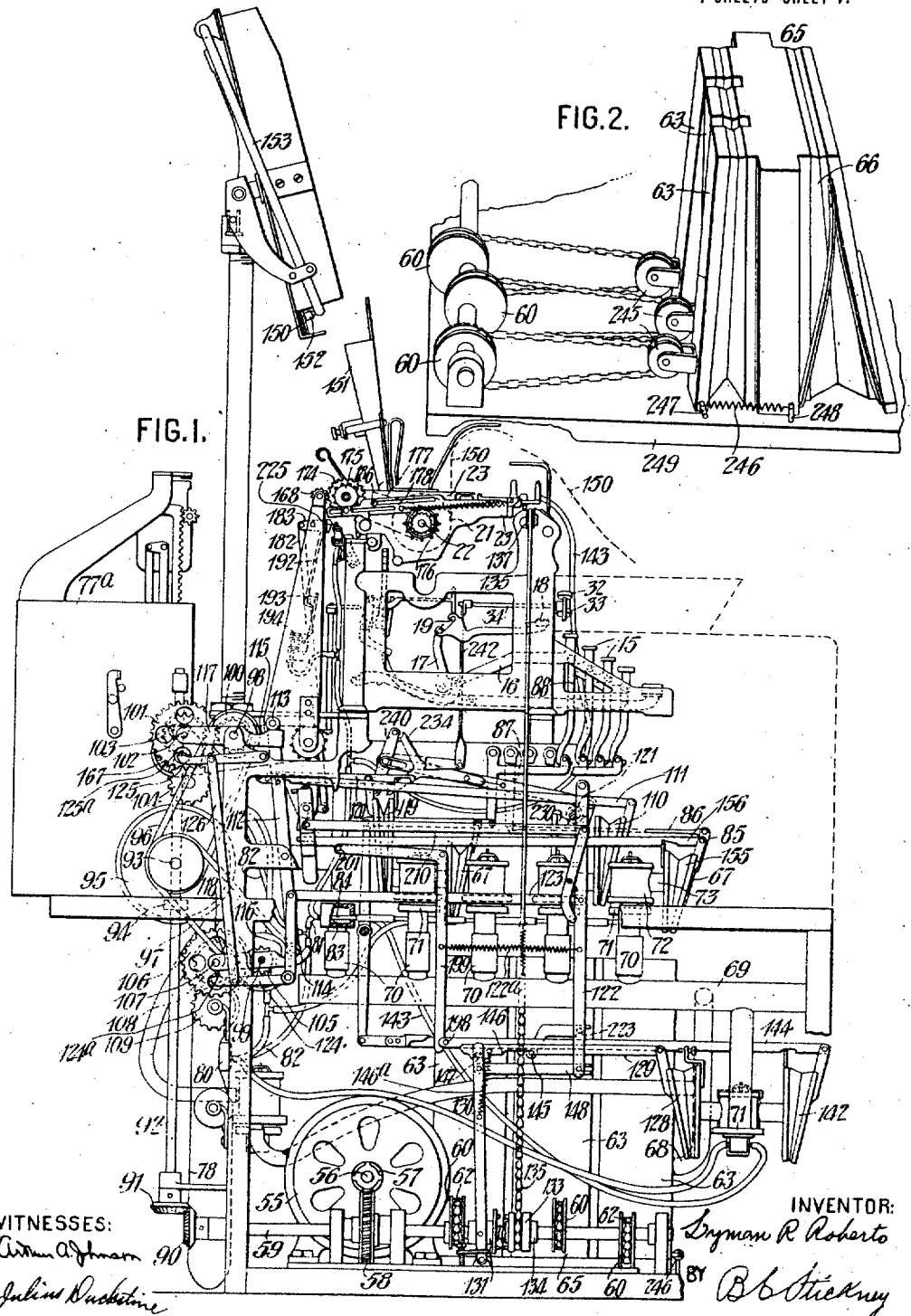

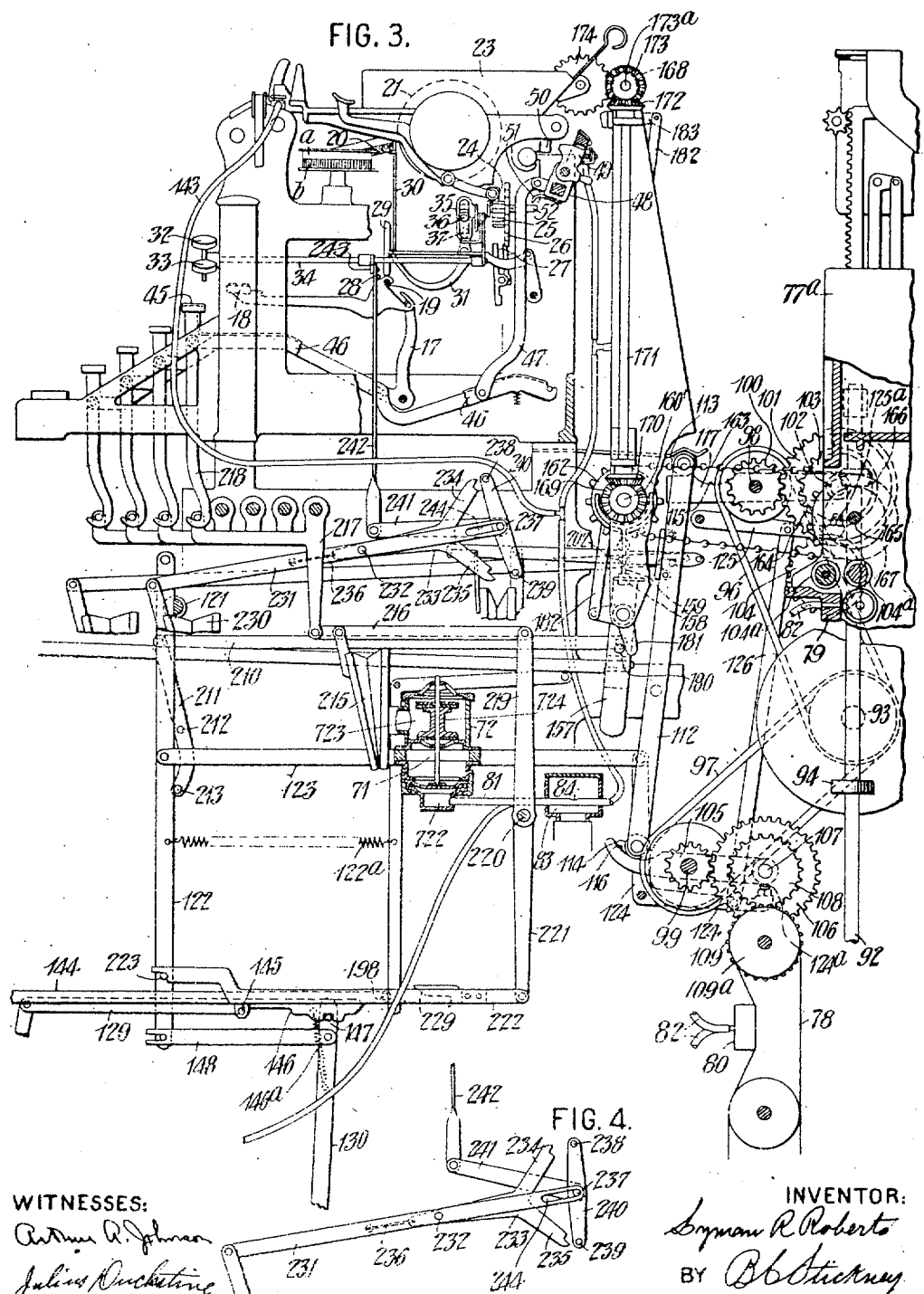

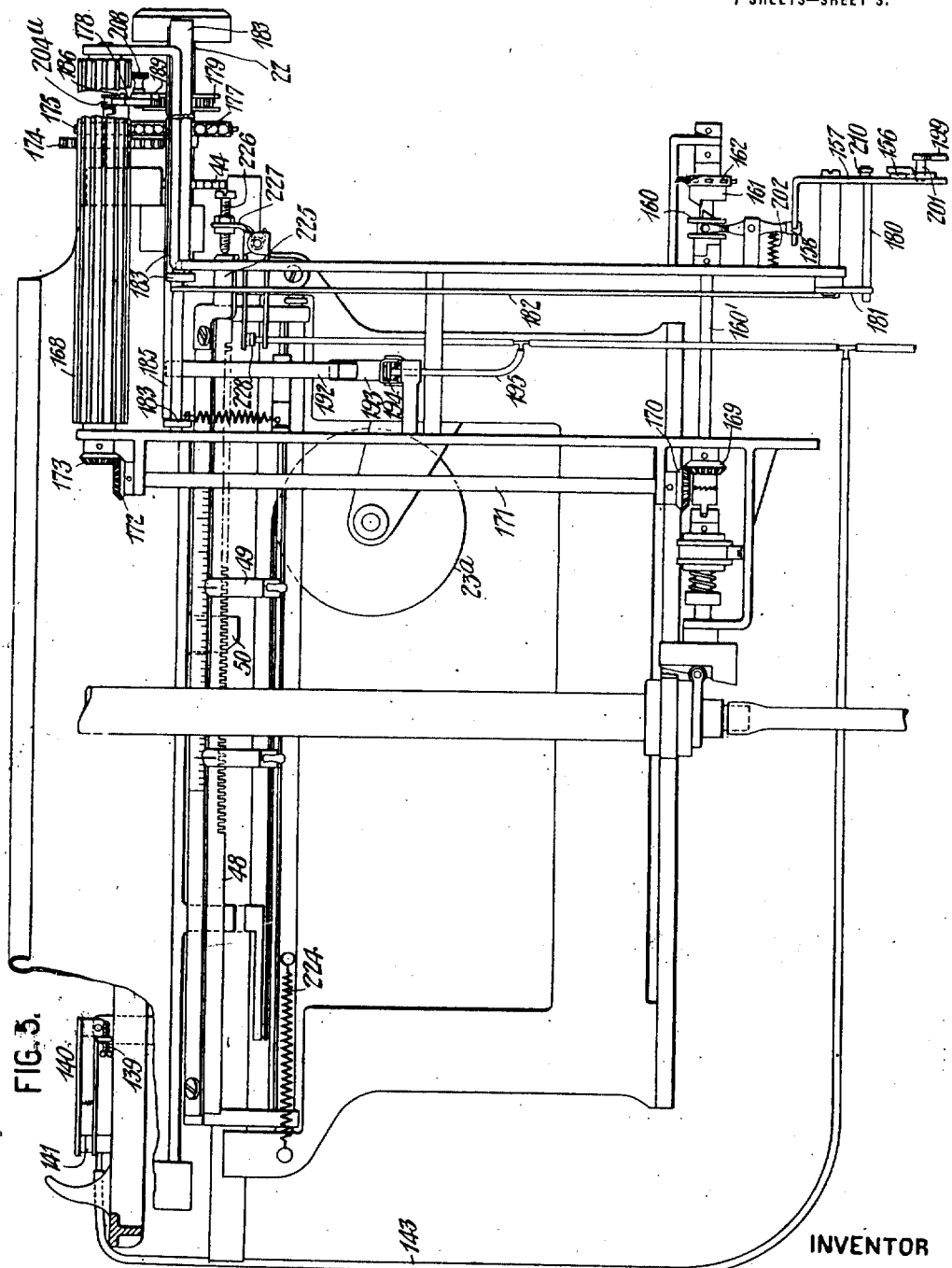

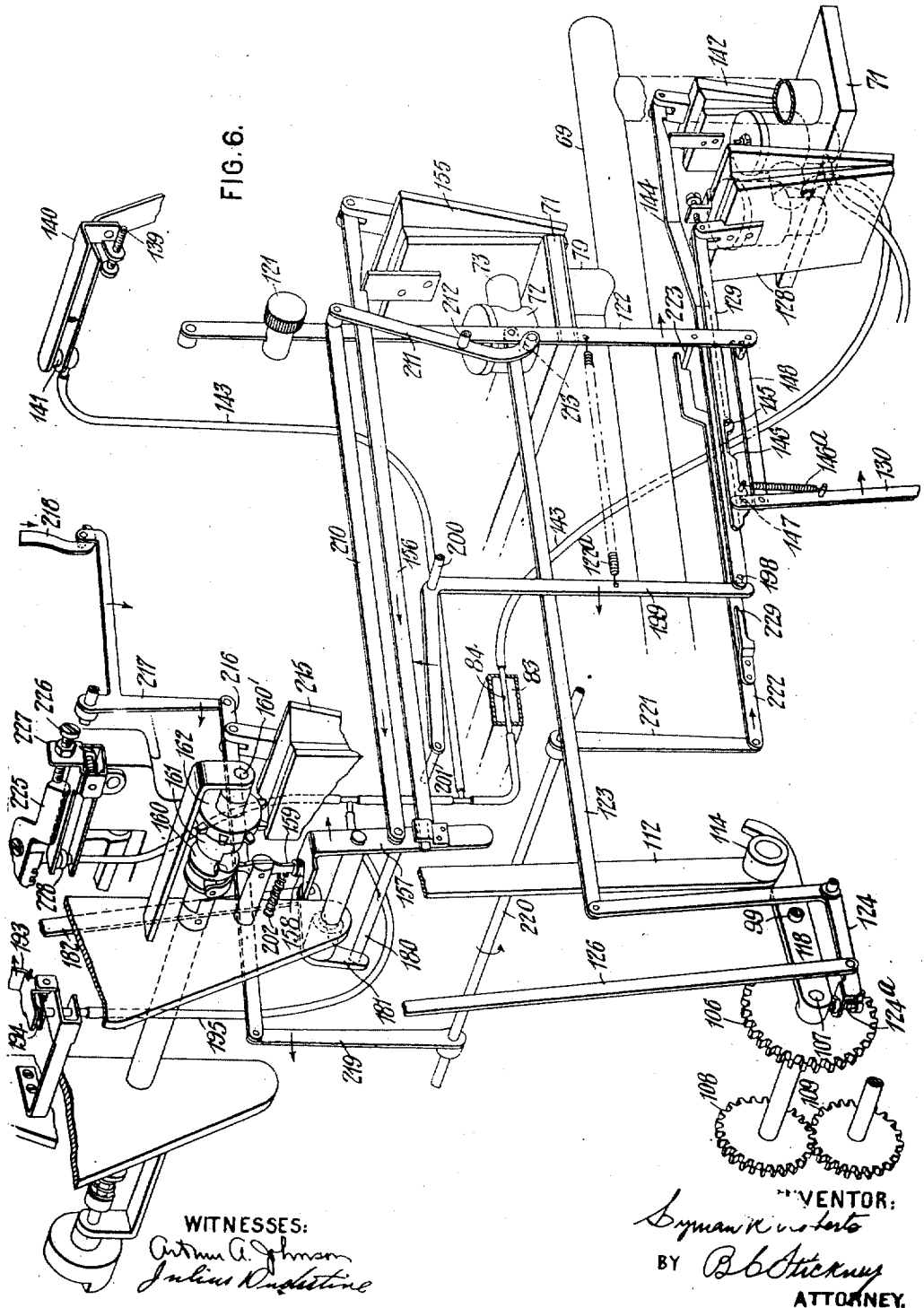

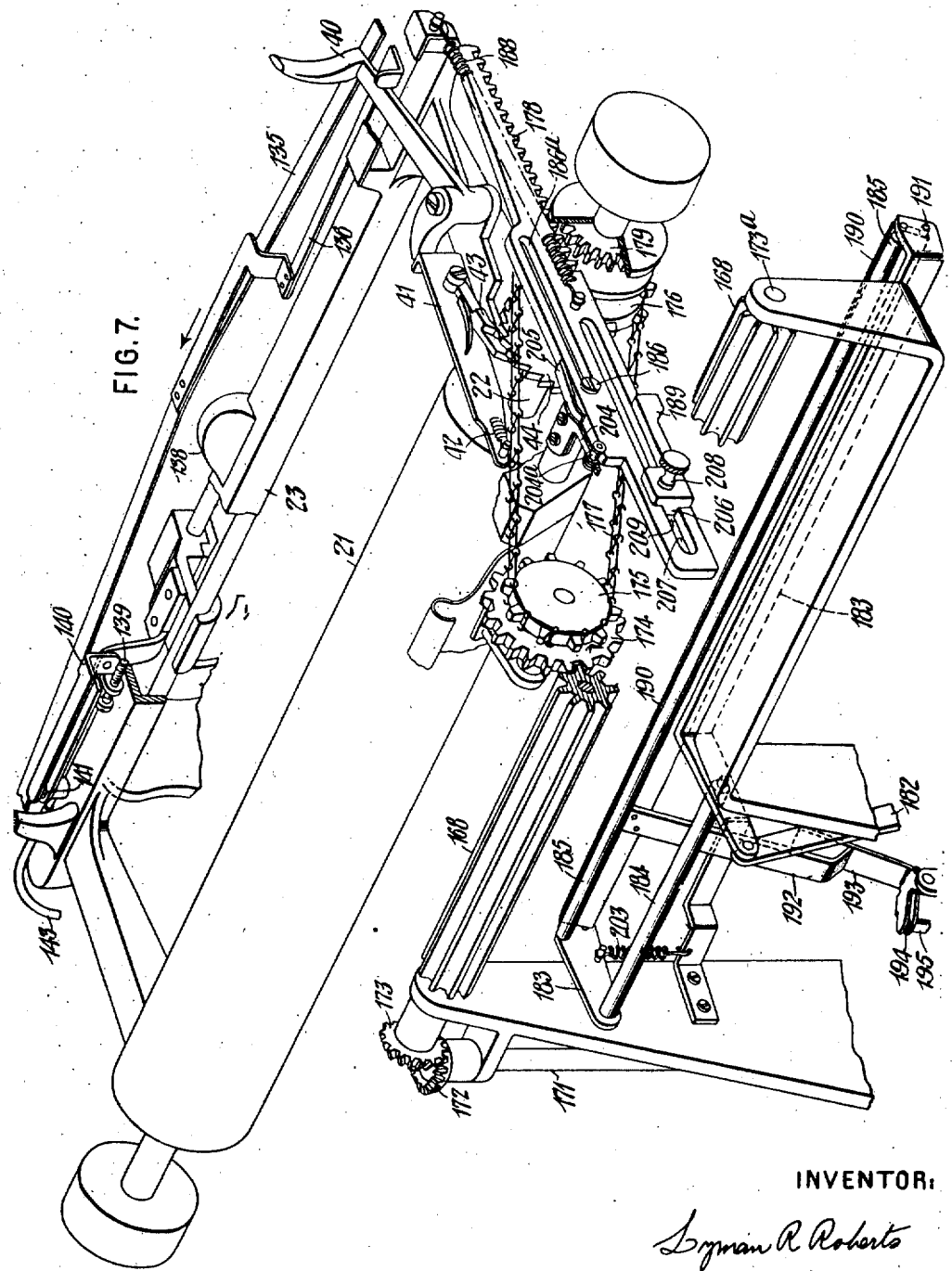

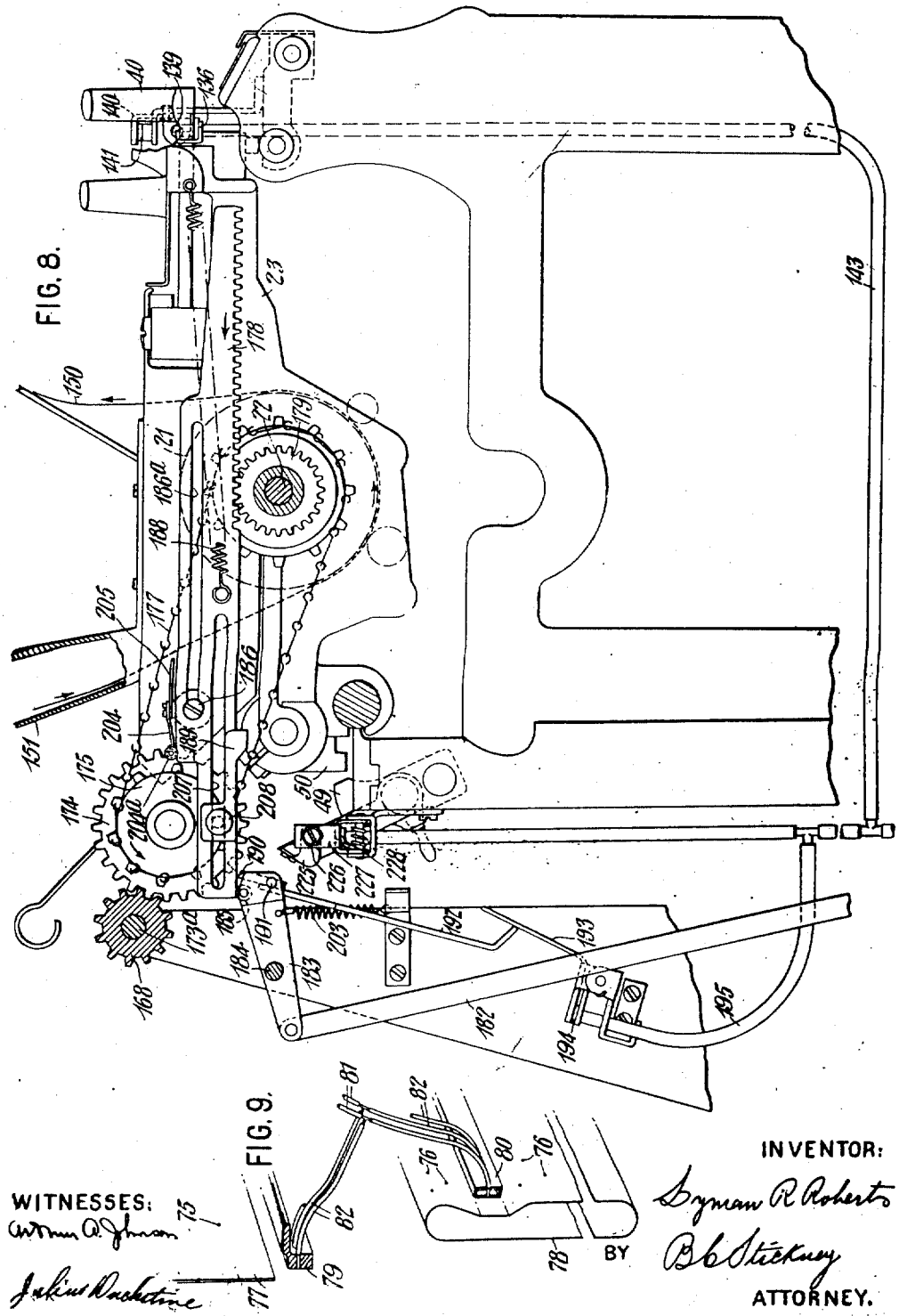

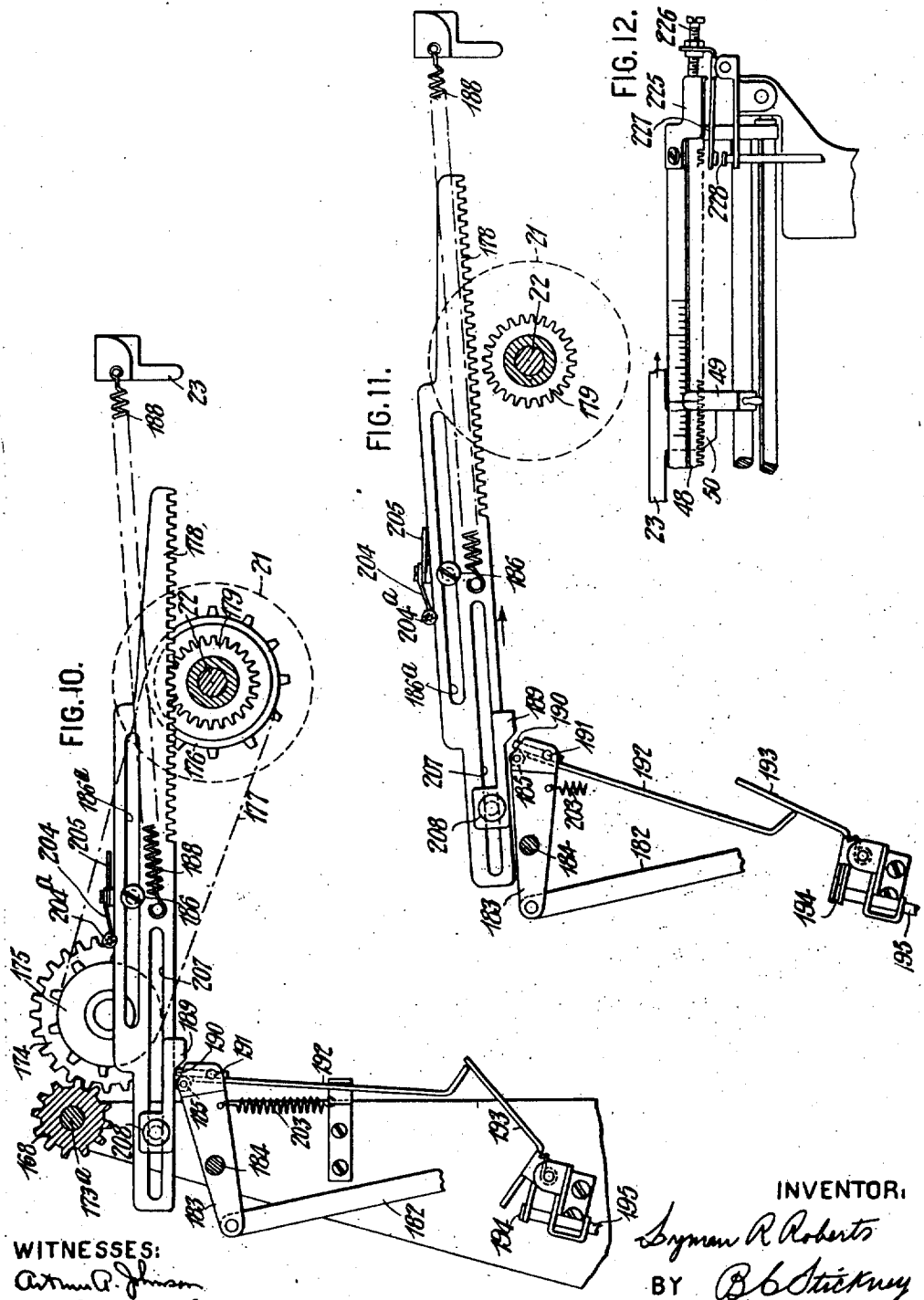

LYMAN R. ROBERTS, OF RUTHERFORD, NEW JERSEY, ASSIGNOR TO UNDERWOOD TYPEWRITER COMPANY, OF NEW YORK, N. Y., A CORPORATION OF DELAWARE.

AUTOMATIC TYPE-WRITER OPERATOR.

1,247,151.

Specification of Letters Patent.

Patented Nov. 20, 1917.

Application filed May 24, 1916. Serial No. 99,488.

*To all whom it may concern:*

Be it known that I, LYMAN R. ROBERTS, a citizen of the United States, residing in Rutherford, in the county of Bergen and State of New Jersey, have invented certain new and useful Improvements in Automatic Type-Writer Operators, of which the following is a specification.

This invention relates to automatic operators for typewriting machines, and is in the nature of an improvement on the construction shown and described in my Patent No. 1,182,314, granted May 9, 1916.

The machine is of the general type in which the typewriting instrumentalities are operated by pneumatic actuators that are controlled by one or more master members arranged to travel across tracker boards; and in the construction illustrated, two members are shown, one for writing the body of the letter, and the other for writing the headings and inserts. Both master members are of the perforated type, so that during their travel, their perforations are brought into register with the apertures in the tracker boards, as is usual, in order to admit air to individual controllers, each of which governs the action of a pneumatic actuator, each actuator being suitably connected to the particular part of the typewriter which it is to operate. In this way, a successive series of actions of the typewriter is produced, according to the arrangement of the perforations in the master members.

Driving mechanism is provided which can be shifted, under the control of perforations in the master members, to bring into action one or the other of said master members, this mechanism being also shiftable into a position where it will be ineffective to feed either master member.

The sheets to be written on are disposed in a pile in a suitable container, and are supplied therefrom, one at a time, by a swinging frame which is provided with suction cups arranged to engage the outermost sheet of the pile, so as to swing it forwardly out of the container into position to drop into a guide or chute mounted on the typewriter carriage. At the proper time, the paper is fed forward around the platen to the printing point, while at the same time, a previously typewritten sheet is discharged from the machine.

In the present case, it has been found advantageous to utilize means for limiting the rotation of the platen, and to provide for the adjustment of the same, so that the platen can be rotated through different angular distances, such means preferably comprising a rack which is thrown, at the proper time, into engagement with a pinion on the platen axle, so as to feed the rack until an adjustable member on the rack is brought into engagement with a device which acts to disconnect the driving mechanism from the platen.

It has also been found desirable, during the course of writing, to perform tabulating operations of the carriage; and in the present construction this may advantageously be accomplished by connecting certain mechanism, which is operated by a pneumatic motor or bellows, to the tabulator key, and by providing one or more tabulating perforations in the master member, so that when one of such perforations is brought to register with a corresponding aperture in the tracker board, during the travel of the master member, the motor is collapsed and, in turn, effects the depression of the tabulator key, said key acting to swing a frame which releases the carriage and brings a stop into the path of a stop on the carriage, thereby arresting the latter at the proper point.

During the tabulating, however, the master-member-feeding mechanism is automatically disconnected, and remains so until the carriage stop engages the tabulator stop, whereupon a slight movement of the stop-carrying frame takes place, which is utilized to actuate certain mechanism whereby the feeding mechanism is again rendered active.

The invention further contemplates the provision of a bichrome ribbon, and means for shifting the same from one field to the other during the course of writing, the shifting operation being preferably accomplished by means of a device which is connected to operate the usual key-actuated rock shaft and is itself operated by a pneumatic actuator. At the proper time, a ribbon-shifting perforation in the master member is brought into register with the corresponding aperture in the tracker board, so as to collapse the motor of the actuator, and, consequently, rock the aforesaid shaft, and thereby shift the ribbon mechanism. The mechanism which connects the pneumatic actuator to the ribbon-shift rock shaft may advantageously include a Y-shaped member, which coöperates with a cross-piece secured to a second rock shaft, and an arm secured to the latter rock shaft and connected to the ribbon-shift rock shaft by a link, the construction being such that a reciprocation of this Y-shaped member causes a one-way rocking movement of the cross-piece.

Other features and advantages will hereinafter appear.

In the accompanying drawings,

Figure 1 is a side elevation showing the relative position of, and the connections between, the typewriting machine and its automatic operator.

Fig. 2 is a perspective view of the bellows or vacuum pump.

Fig. 3 is a part-sectional, fragmental elevation of the invention, taken from the opposite side to Fig. 1.

Fig. 4 is a fragmental view of the ribbon-shifting mechanism.

Fig. 5 is a fragmental rear elevation.

Fig. 6 is a fragmental, perspective view, showing the tabulating mechanism and various parts operatively associated therewith.

Fig. 7 is a perspective view, showing the platen-rotating means, the driving rack being in its normal or ineffective position.

Fig. 8 is a part-sectional side elevation, illustrating the connection from the pneumatic operator to the platen, the driving rack being shown as lowered into engagement with the pinion on the platen axle.

Fig. 9 is a perspective view, showing the two trackers and the branch connections of the tubing leading thereto.

Fig. 10 is a view similar to Fig. 8, but with the driving rack moved into its operated position.

Fig. 11 is a view similar to Fig. 10, but showing the driving rack as raised out of mesh with the pinion on the platen axle, preparatory to being restored to normal position.

Fig. 12 is a fragmental, rear view showing the carriage stop engaging the tabulator stop, the stop-carrying frame being shifted thereby to re-connect the master-member-feeding mechanism.

Referring more particularly to the separate parts of the invention as embodied in the form shown in the drawings, there is disclosed a pneumatic operator which is located partly below and partly behind a standard typewriter. The latter may be of any suitable make, such as the Underwood, and usually includes type keys 15 (Fig. 1) which, when depressed, operate key levers 16 to rock bell cranks 17, so as to swing type-bars 18 upwardly and rearwardly about a fulcrum 19 to print through a ribbon 20 against a cylindrical platen 21, said platen having its axle 22 mounted to rotate in a platen frame forming part of the usual carriage 23 of the typewriter.

The step-by-step movements of the typewriter carriage toward the left are derived from a spring drum 23ª (Fig. 5) as is customary, the action of said drum being controlled by a rack 24 on the carriage which meshes with a pinion 25 (Fig. 3) connected with an escapement wheel 26, the latter controlled by the usual escapement dogs 27. The type-bars 18 are each provided with a heel 28 which strikes against the universal bar 29, so as to operate said escapement dogs 27.

The ribbon 20 comprised in the ribbon mechanism consists of two colored bands a and b united edge to edge, the ribbon being threaded through a vibrator 30 (Fig. 3), which is raised to bring the ribbon into the path of the types by a lever 31, connected with the universal bar 29, at each key stroke.

To set the bichrome ribbon so as to print on either the red or black field or portion thereof, two keys 32 and 33 (Fig. 3) are provided, as is usual, these keys being fixed to a rock shaft 34. The latter is connected to the actuator 35, and, on being rocked, shifts said actuator out of engagement with one of the pins 36, 37 on the vibrating lever 31, into engagement with the other pin, to change the point of connection between the actuator and the said lever 31, for the purpose of imparting a greater or less throw to the ribbon.

Line-spacing of the platen is effected by means of the usual line-space handle or lever 40 (Fig. 7) which moves a slide 41 against the tension of a return spring 42, said slide having pivoted to it the line-space pawl 43, which co-acts with a line-space wheel 44 secured to the platen axle.

The tabulating mechanism may advantageously comprise a key 45 which, when depressed, operates a lever 46 to pull a link 47 downwardly and rock forwardly a stop-carrying frame 48 (Fig. 3) to bring a stop 49 on said frame into the path of the co-operating stop 50 on the carriage 23. During this movement, the carriage automatically is released by means of a finger 51 which is connected to the stop frame and is arranged to depress a lever 52, so as to raise the rack 24 out of engagement with the escapement pinion 25, thus setting the carriage free to be moved by the spring drum until it is arrested by the stops 49 and 50 coming in contact with each other.

Having thus briefly described the more essential parts of the typewriter itself, the description of the automatic operator therefor will now be taken up. The said operator has its motive source in an electric motor 55 (Fig. 1) provided with a shaft 56 having a worm 57 thereon which meshes with and drives a worm wheel 58 secured to a shaft 59. The shaft 59 is provided with eccentrics 60 (Figs. 1 and 2), arranged to drive the sections 63 of the bellows vacuum pump 65, (Fig. 2), said sections being equipped with rollers 245, which are connected with the eccentrics by continuous chains, belts or other flexible elements 62. The pump sections normally tend to collapse, consequent upon the action of springs 246, each connected at one end to a pin 247 thereon, and at the other end to a pin 248 on the base 249, the arrangement being such, therefore, that one or two sections will always be filling, while the remainder of the set are exhausting, so that a common vacuum chamber 66 will be maintained constantly under suction, so long as the motor is running, this suction or vacuum chamber 66 communicating with the several pneumatic actuators, through a main pipe 68, a feeder 69 and various laterals 70. The employment of the eccentrics and continuous chains or other flexible elements results in the provision of a practically noiseless action for the vacuum pump, and is, as previously stated, one of the features of the present invention.

The pneumatic actuators are controlled in the usual manner by perforations 75 and 76 in the master members 77 and 78, as the latter are fed across the trackers 79 and 80. These actuators may be, and preferably are, of the same type as those shown and described in my said patent, and each comprises a motor in the form of a collapsible bellows, and a controller 72 therefor connected to the motor by a pipe 73 and to the trackers by main and branch tubes 81 and 82 (Fig. 9), the actuators for the type-bar levers being indicated at 67.

The tubes 81 extend through a common suction or bleed chamber 83 (Figs. 1 and 3) which is connected by a lateral 70 with the feeder 69, the portion of each tube within said chamber being provided with a bleed opening 84 of sufficient size to gradually exhaust the air from the chamber 722 at the bottom of the corresponding controller, so as to maintain said chamber 722 normally under a negative or sub-atmospheric pressure. The controllers are so constructed that the equalizing chambers 723 at the upper portions thereof are normally open to the atmosphere, thus admitting air to the corresponding bellows or motor members of the actuators; the intermediate portions 71 of the controllers, however, are constantly under suction owing to their connection with the feeder 69 through the laterals 70.

Hence it follows that when a perforation in either master member comes into register with an aperture in the accordant tracker, air will be admitted through the tubes 82 and 81 to the chamber 722 of the corresponding controller, and will actuate the valve mechanism 724 therein, so as to establish communication between the suction chamber 71 of the controller and the motor or bellows, thereby causing the latter to collapse. Each motor has affixed thereto an upright arm, which is moved laterally when the collapse of the motor takes place; and in the case of the type-bar actuators 67, these arms, which are indicated at 85 (Fig. 1), operate to shift links 86 that are pivoted to bell cranks 87 connected by vertical links 88 with the key levers 16, so as to depress said levers and thus cause the type-bars to print.

In the case of the tracker 80, the master member 78 which controls the same, is shown in the form of an endless perforated sheet, which may be passed repeatedly in front of said tracker, since the matter which it controls, such as the body of the letter, is to be repeated over and over again in each new sheet of typewriting. In the case of the upper tracker 79, which controls the writing of the inserts, the master member may consist of a set of individual perforated cards 77 contained in a holder or receptacle 77ª, which cards are successively brought into coöperation with the tracker to control the action thereof.

The mechanism provided for feeding the master members is shiftable, so as to act on said members in alternation, and likewise is, or may be, identical with that shown and described in said patent. It is driven from the constantly-rotating shaft 59, which transmits its movement, through beveled gears 90 and 91 (Fig. 1), to the vertical shaft 92, the latter driving the shaft 93 by means of a friction roller 94 and disk 95 (Fig. 3). Shaft 93 transmits motion, by means of belts 96 and 97, to the feeding shafts 98 and 99, the former shaft carrying a pinion 100 that meshes with and drives a gear wheel 101 secured to a shaft 102, said shaft 102 being also provided with a second gear wheel 103 which is shiftable into and out of mesh with a pinion 104. This pinion 104 is secured to one of a pair of coacting rollers 104ª, which are employed to feed the master cards 77 in the manner set forth in said patent. The lower feeding shaft 99 is similarly provided with a pinion 105 which meshes with and drives a gear wheel 106 on the shaft 107, the latter also provided with a second gear wheel 108 which is shiftable into and out of mesh with a gear wheel 109. Gear 109 is connected to a supporting and driving roller 109ª (Fig. 3) over which the master member 78 passes.

The actuation of the two control sets for feeding the master members, takes place in the same way as in the patented construction; that is to say, in alternation, so that only one master member is effective at a time. In this way, a name and address can be written with the aid of a master card, and the control then shifted to cut out the card-feeding means and cut in the feeding means for the master sheet, after which, the body of the letter may be written.

This shifting from one master member to the other, is effected by rocking to one side or the other a vertically-disposed shifting lever 112, equipped at its opposite ends with bearing rollers 113 and 114. Said rollers are designed to coöperate with cams 115 and 116 provided at the front ends of upper and lower shift arms or frames 117 and 118, which are pivoted intermediate their ends on the shafts 98 and 99 respectively, the shafts 102 and 107 being floatingly mounted at the rear ends of the said shift arms. Thus the rollers 113 and 114 will move in opposite directions, and when the shifting lever 112 is rocked, so that assuming that the parts are in the position depicted in Fig. 3, the roller 113 will be engaged with the high portion of cam 115, while the roller 114 is engaged with the low portion of cam 116; in consequence, the upper gear 103 will be raised out of engagement with the pinion 104, while the lower gear 108 will be dropped into engagement with the pinion 109, thereby rendering the master-card feed inactive, and the master-sheet feed active. On the other hand, when the shifting lever is rocked in the opposite direction, the operations will be reversed; that is to say, the upper roller will engage the low portion of cam 116, and thereby permit the gear 103 to drop into mesh with pinion 104, while the lower roller 114 will ride onto the high portion of cam 116 and will produce the unmeshing of gear 108 from pinion 109. This will throw in the master card feed and throw out the master sheet feed, as will be understood.

The manipulation of the shifting lever necessary to reverse the feed is controlled from a perforation in the then active master member. In the case of the master card 77, said card is brought into play by a perforation in the master sheet 78, when such perforation comes into register with an aperture in the tracker 80, at which time air is admitted to collapse an actuator 110 (Fig. 1), said actuator having pivoted to it a link 111 which is connectible to the upper portion of the shifting lever. The master sheet 78 is brought into play, in like manner, by a perforation in the then active master card 77, which, on registering with the accordant aperture in the tracker 79, admits air to collapse an actuator 119, connected by a link 120 with said shifting lever, the two links 111 and 120 acting in opposite directions. The mechanism for changing or substituting the master cards is, or may be, identical with that shown in said patent, but since it forms no part of the present invention, its description is omitted herefrom.

To throw out the feeding mechanism for both master members, which is sometimes found advisable, there is provided a throwout button 121 (Figs. 3 and 6) which, when rotated, cams a rocking shifting bar 122 to one side, so as to draw on a link 123 and rock a bell crank 124. One arm of this bell crank 124 is provided with an offset terminal equipped with an adjusting screw 124ª (Fig. 6) which underlies and is designed to engage with the shift frame 118, said arm being connected by a link 126 to a lever 125 which carries a similar adjusting screw 125ª that underlies the shift frame 117. Thus the gear-bearing ends of both frames are raised simultaneously when bar 122 is rocked as above described, with the result that the drive for both members is interrupted at the same time.

The return of the carriage and line-spacing of the platen, after the completion of a line of writing, are brought about automatically, consequent upon the registration of a carriage-return perforation in the master member with the corresponding aperture in the tracker board, such registration exciting a pneumatic actuator 128 (Fig. 6) to action in the usual way, so that a link 129 will be pulled by the collapse of the bellows motor thereof to rock a shifter 130. This shifter, as in the patented construction, is employed to move a shiftable clutch member 131 (Fig. 1) splined on the constantly-rotating shaft 59, into engagement with a second clutch member 133, loosely mounted on said shaft, against the tension of an uncoupling spring 132, the last-named clutch member being held in position on the shaft by a collar 134. The loose clutch member is connected by a band or other flexible element 135, with the typewriter carriage, as shown in Fig. 7, said band passing over suitable guide rollers 137 (Fig. 1) and having secured to it a connecting hook or connector 136 for engagement with the line-space lever 40.

To release the carriage from the driving mechanism as the carriage approaches the end of its return movement, a trip 138 (Fig. 7) is provided, to contact with an adjustable stop 139 carried by a valve lever 140 to open a normally-closed valve 141, which is connected to the bellows motor of a pneumatic actuator 142 (Fig. 6) by tubing 143, the latter passing through the bleed chamber 83. The opening of this valve 141, as in the earlier construction, causes the collapse of the bellows motor 142, which forces a link 144 to the left in Fig. 6, whereby a pin 145 on said link 144 is brought into contact with a cam 146 on link 129 and raises the latter out of engagement with a pin 147 on the clutch shifter 130. This frees the said clutch shifter 130 which immediately moves back to its normal position under the influence of the spring 132, thereby effecting the disengagement of the clutch members 131 and 133.

Provision is made for silencing the feeding mechanism for the master members while the carriage is being returned to start a new line of writing, by utilizing a link 148 which is pivoted at one end to the clutch shifter 130 and has a loose connection at its other end with the silencing bar 122, the arrangement being such that the movement of the clutch shifter toward the right (Fig. 6), consequent upon the collapse of the actuator 128, effects the active or clutch-opening stroke of the silencing bar in the same direction; while the return movement of the clutch shifter to normal position (Fig. 1) permits the corresponding return movement of the silencing bar to take place under the influence of the spring 122$^a$, and, therefore, the operation of the feeding mechanism to recommence.

The delivery of the work-sheets 150, one at a time, from the holder 150$^a$ to the guide or chute 151 on the typewriter carriage, is accomplished by means of the suction cups 152 provided on a swinging frame 153, the action taking place in the manner described in said patent, to which reference may be had for a complete understanding thereof. Further description in the present case is deemed unnecessary.

The discharge of a typewritten sheet 150, and the feeding forward to the printing line, of the new sheet 150, which has been previously delivered to the platen 21 from the chute 151, take place after the last line on the sheet has been written and after the carriage has been returned to the right. These operations are effected automatically, as in the earlier construction, consequent upon a perforation in the master member coming into register with the accordant aperture in the tracker, it being understood that prior to this time the feeding mechanism has again been thrown into operation. The registration of said perforation and aperture excites a pneumatic actuator 155 (Fig. 6), whose bellows motor is thereby collapsed and caused to thrust forward a link 156, the latter connected to rock a cam lever 157 which engages a roller 158 provided on the end of a shifting fork or lever 159. The latter is connected with a sliding clutch member 160, splined on a shaft 160', and when operated, acts to throw said clutch member 160 into engagement with a second clutch member 161 that forms part of a sprocket 162 loosely mounted on shaft 160'. This sprocket is constantly driven from a shaft 165 by a chain 163 which passes around a sprocket 164 on said shaft, so that when the clutch fork 157 is rocked, as above described, to close the clutch, the rotation of shaft 165 will be transmitted to shaft 160'. Shaft 165 is itself constantly driven from shaft 92 (Fig. 3) by means of a bevel pinion 166 on the latter shaft which meshes with and drives a bevel gear 167 on the said shaft 165.

The rotation of the platen necessary to produce the operations in question is also effected consequent upon the engagement of the clutch members 160 and 161. For this purpose, there is employed a barrel pinion 168, which is mounted on the machine frame and is driven from shaft 160' through the intermediary of pairs of intermeshing bevel gears 169 and 170, and 172 and 173; the gear 169 being fixed to shaft 160', the gears 170 and 172 to a vertical transmission shaft 171, and the gear 173 to the pinion shaft 173$^a$. Pinion 168 meshes with and drives a gear 174 (Figs. 7, 8 and 10), which is suitably mounted on the carriage and has rigidly secured to it a sprocket 175, the latter connected by a chain 177 with a sprocket 176, secured to the platen axle, so that rotation of the barrel gear is thus transmitted to the platen, as will be understood.

The barrel pinion 168 is here shown as of such length that the gear wheel 174 will always remain in mesh with it while the carriage is being moved from side to side of the machine; but, if preferred, said pinion may be so proportioned that it will be engaged by gear 174 only for a short interval while the carriage is at the right-hand end of its travel, and is disengaged therefrom at other times.

To throw out the platen-driving mechanism after the platen has been rotated through the required angular distance, special mechanism constituting another important feature of the present construction is provided. Such mechanism may advantageously include a rack bar 178 (Figs. 7, 8, 10 and 11), which is fulcrumed intermediate its ends upon a pin or screw 186, fixed to the carriage, said fulcrum extending through a longitudinal slot 186$^a$ in the rack. This rack is designed to be driven by the platen, during the multi-space rotation of the latter, until the opening of a valve is effected, said action admitting air to a pneumatic actuator, which, in turn, opens the clutch 160—161 in the manner hereinafter described. In the construction illustrated, the rack 178 is driven from a pinion 179 fixed to the platen, said rack being disposed above, and normally out of mesh with, said pinion 179, but lowered into mesh therewith simultaneously with the closing of the said clutch. To carry out this operation, the cam lever 157 has connected to it a lateral pin or rod 180 (Fig. 6), which engages a bell crank 181, so that when said lever is rocked, the bell crank likewise will be rocked and will exert a downward pull upon a link 130

182 (Figs. 6 and 7). This link is connected to the forwardly-extending end of one of the side arms of a frame 183 provided at its rear with a roller 185, so that as said link descends, it causes said frame to rock about its fulcrum 184, the roller-carrying end of the frame rising. Now, the closing of the clutch takes place, as above stated, when the carriage is at the right of the machine, so that at this time the roller 185, which is located at the right-hand side of the machine frame, underlies the rack. Consequently, the ascent of the said roller will raise the rear end of the rack and lower its front end, thereby bringing the teeth on the latter end into mesh with the pinion 179. The platen being at that time in motion, the rack will be driven rearwardly, against the tension of a spring 188. The movement of the rack continues until a member 189, with which it is equipped, strikes against a plate or bar 190, pivoted at 191 to the frame 183 and rocks said bar, the parts being then in Fig. 10 position.

Bar 190 has connected to it an arm 192 which engages the extended end of a valve lever 193, so that the rocking of said bar causes its said arm 192 to rock lever 193 and thereby open a valve 194 that is connected by a tube 195 (Fig. 6) with the pneumatic actuator 142. Air is thus admitted to said actuator, the bellows motor of which collapses and forces link or plunger 144 to the left, so that a pin 198 carried by said link adjacent its free end is caused to engage and rock a bell crank 199 about its fulcrum 200 against the tension of spring 122ª. The horizontal, upper arm of the bell crank carries a pin 201, which underlies link 156, the latter being raised by said pin so as to release the cam lever 157. Lever 157 then returns to its normal position under the influence of spring 202, thereby opening the clutch 160—161.

When the cam lever 157 returns to normal position, its pin 180 moves away from the bell crank 181, and the roller 185 is lowered by means of a spring 203. As soon as this action takes place, the rack 178 becomes disengaged from the pinion 179 and assumes the position indicated in Fig. 11, due to the provision of a spring 204, which bears upon its rear portion, so as to cause the same to swing downward about the fulcrum 186, such movement being terminated by a stop 205 which is arranged to engage the forward portion of the rack. The spring 188 then draws said rack forward to normal position.

In order to rotate the platen through different angular distances in bringing the fresh sheets to the printing point, which is necessary where the first printing line is to be located at different distances from the tops of the sheets, the stop member 189 is adjustably fitted to rack 178, so as to enable its position thereon to be regulated. In the present instance, said member is shown as in the form of a slide, disposed against one face of the rack and provided with a stem 206 that projects through a longitudinal slot 207 in said rack, the slide being clamped in adjusted position by means of a screw 208 and plate 209 (Fig. 7) or analogous device.

During the rotation of the platen incidental to the discharge of a typewritten sheet from the machine, the feeding mechanism must be disconnected. To effect this, the cam lever 157 is utilized to rock the silencing bar 122, as in the earlier construction, so as to open the driving clutch 131, 133, for which purpose said lever 157 is connected by a link 210 (Fig. 6) with a lever 211 fulcrumed between its ends at 212, the lower arm of the lever 211 carrying a pin 213 that engages bar 122. The rocking movement of lever 157, produced by link 156, will thus be transmitted to lever 211, and thence to bar 122. The movement of link 156 is occasioned, in turn, by the collapse of the bellows motor of actuator 155, consequent upon the registration of a work-sheet-discharging perforation in the master member, with the accordant aperture in the tracker, as already described; and when this takes place, the feeding operation is discontinued and said perforation and aperture remain in register, with the bellows collapsed, until the valve 194 is opened to bring about the release of the link 156 from the cam lever 157, thus permitting the cam lever to be restored to its normal position. The return movement of said cam lever is effective to bring about a re-connection of the feeding mechanism, with the result that after the feeding of the master member has been resumed, the work-sheet-discharging perforation is taken out of register with the aperture in the tracker, whereupon the actuator 155 and, consequently, the link 156 resume their normal positions.

Tabulating operations of the typewriter carriage, which are one of the important features of the present invention, as previously stated, are brought about by special perforations in the master members, any one of such perforations, when brought into register with the corresponding aperture in its respective tracker, causing the collapse of the bellows motor of a pneumatic actuator 215 (Figs. 3 and 6). This actuator, when operated, shifts a link 216 rearwardly, thereby rocking a bell crank 217 counterclockwise (Fig. 3) and, in consequence, depressing the tabulator key lever 46, which is connected by a hook 218 with said link. The tabulator then operates as heretofore described. The throw-out for the feeding mechanism is effective during tabulating operations, and is brought into action by the link 216, when the latter is moved rearwardly, at which time it rocks an arm 219 (Fig. 6) secured to a rock shaft 220. A second arm 221 on this rock shaft 220 thrusts a link 222 forwardly, said link engaging with a pin 223 on the bar 122 to rock said bar and thereby silence the feeding mechanism by the link 123, as heretofore described.

The feeding mechanism remains disconnected while the carriage is running, until the stop 50 on the carriage strikes against the tabulator stop 49, the impact of the blow being sufficient to cause a slight movement of the stop-carrying frame 48 in the same direction, against the action of a spring 224 (Fig. 5). Said frame is provided at one end with an extension 225, which, when the movement just referred to takes place, engages with an adjustable screw 226 on a lever 227 (Figs. 5, 6 and 12), said lever swinging about its fulcrum, so as to open a valve 228. The opening of the valve 228 causes the collapse of the bellows motor 142 (Fig. 6), which thrusts the link 144 rearwardly, to bring the pin 198 into engagement with a cam 229 secured to the link 222. The latter, at this time, is in its actuated position, so that its cam 229 is disposed far enough forward to permit its engagement by pin 198 during the said rearward movement of link 144. This engagement of said cam and said pin causes the forward end of link 222 to rise out of engagement with the pin 223, thus freeing the silencing bar 122, which returns to its normal position under the action of spring 122ª and pulls link 123 with it, whereupon the feeding mechanism is again re-connected or restored to operation, as heretofore described.

The shifting of the bichrome ribbon from one field to the other, which is a further feature of the present case, is effected by a ribbon-shift perforation in the master member, which is brought to register with an aperture in the corresponding tracker board, thereby causing the collapse of the bellows motor of an actuator 230 (Figs. 1 and 3), which, in turn, thrusts a link 231 rearwardly. To this link 231 there is pivoted at 232 a Y-shaped member 233 (Fig. 4) having diverging upper and lower arms 234 and 235, said member 233 being engaged by a spring 236, which tends to hold it in an intermediate position. When the link 231 is moved rearwardly, the Y-shaped member 233 rocks a shaft 237 in consequence of either of its arms 234 or 235 engaging one or the other of a pair of pins 238 and 239, fixed to the opposite ends of a cross-piece 240 secured to the rock shaft 237. The shaft 237 has attached thereto an arm 241 which is connected by a link 242 to an arm 243 on the ribbon-shift rock shaft 34.

In the position represented in Figs. 1 and 3, the parts are so set that a rearward motion of the link 231 causes the upper arm 234 on the Y-shaped member 233 to engage the upper pin 238 on the cross-piece 240, thus rocking the shaft 237 clockwise and causing an upward movement of the arm 241. This movement of arm 241 serves to rock the shaft 34 by means of the link 242 and thus cause the shifting of the ribbon so as to expose its $b$ field to the action of the types. During the first part of its rearward movement, the Y-shaped member 233 is lifted slightly out of its intermediate position, due to its arm 234 engaging the pin 238, this lifting taking place before the rocking movement of the cross-piece 240 commences. Then, as the movement of the link 231 continues, the cross-piece is rocked, with the result that the lower pin 239 thereon clears the lower arm 235. When the link 231 returns to its normal position, as indicated in Fig. 4, the cross-piece 240 will have been shifted to the position indicated in said figure, so that if said link 231 is again moved rearwardly, the said lower arm 235 will engage with the pin 239, to initially cause a movement of the Y-shaped member to the other side of its intermediate position, so that its upper arm 234 will be clear of the path of the upper pin 238 on the continued rearward movement of the said Y-shaped member. Then, when the link 231 and the Y-shaped member 233 are restored to their normal position, the cross-piece 240 will have been shifted to the Fig. 3 position, and consequently the ribbon will have been shifted to expose its $a$ field to the type-bars. The rock shaft 237 constitutes a guide for the link 231 during its movements, owing to the provision of a longitudinal slot 244 (Fig. 4) in said link, through which the said shaft extends.

The complete operation is believed to be apparent from the foregoing, and a separate description thereof is accordingly omitted.

Variations may be resorted to within the scope of the invention, and portions of the improvements may be used without others.

Having thus described my invention, I claim:

1. The combination, with a platen, and driving means therefor; of a master member for controlling the bringing into play of said driving means; silencing means for said driving means; and means directly operated by said platen for automatically actuating said silencing means after a predetermined rotation of said platen.

2. The combination, with a platen; a source of power, and a normally-interrupted train of gearing leading from said source of power to said platen for rotating the latter when the train is completed; of a master member for controlling the completion of said train; means for interrupting said train; and means directly operated by said platen for automatically actuating said interrupting means after a predetermined rotation of said platen.

3. The combination, with a platen, and driving means therefor; of a master member; a pneumatic actuator controlled thereby for bringing said driving means into play; silencing means for said driving means; a pneumatic actuator for bringing said silencing means into play; and means directly operated by said platen for governing the action of the second-named pneumatic actuator.

4. The combination, with a platen, and driving means therefor; of a master member for controlling the bringing into play of said driving means; silencing means for said driving means; a member directly driven by said platen during its rotation; and means automatically operated by said driven member on being driven to a predetermined extent, for actuating said silencing means.

5. The combination, with a platen, and driving means therefor; of a master member for controlling the bringing into play of said driving means; silencing means for said driving means; a member adapted to be directly driven by said platen during its rotation, but normally in ineffective position for such drive; means for moving said driven member into effective position; and means automatically operated by said driven member on being driven to a predetermined extent, for actuating said silencing means.

6. The combination, with a platen, and driving means therefor including a normally-open clutch and clutch-operating means; of a master member for controlling the clutch-closing action of said operating means; means associated with said operating means for effecting the clutch-opening action thereof; and means directly operated by said platen for automatically actuating said clutch-opening means after a predetermined rotation of said platen.

7. The combination, with a platen, and driving means therefor including a normally - open clutch and clutch - operating means; of a master member for controlling the clutch-closing action of said operating means; means associated with said operating means for effecting the clutch-opening action thereof; a member adapted to be directly driven by said platen for automatically actuating said clutch-opening means after a predetermined rotation of said platen, but normally in ineffective position for such drive; and means actuated by said operating means consequent upon its clutch-closing action, for moving said driven member into effective position.

8. The combination, with a platen, and driving means therefor including a normally - open clutch and clutch - operating means; of a master member; a pneumatic actuator controlled thereby for effecting the clutch-closing action of said operating means; a separate pneumatic actuator associated with said operating means for governing the clutch-opening action thereof; and means directly driven by said platen during its rotation for automatically bringing the second-named pneumatic actuator into action after a predetermined rotation of said platen.

9. The combination, with a platen, and driving means therefor including a normally - open clutch and clutch - operating means; of a master member; a pneumatic actuator controlled thereby for effecting the clutch-closing action of said operating means; a separate pneumatic actuator associated with said operating means for governing the clutch-opening action thereof; a valve for controlling the action of the second-named actuator; and a member driven by said platen during its rotation arranged to strike against and open said valve after a predetermined rotation of said platen.

10. The combination, with a platen, and driving means therefor; of a master member for controlling the bringing into play of said driving means; silencing means for said driving means; and a rack operable directly by said platen during its rotation for automatically actuating said silencing means when the rack has been moved a predetermined distance.

11. The combination, with a platen having a pinion on its axle, and driving means for said platen; of a master member for controlling the bringing into play of said driving means; silencing means for said driving means; and a rack directly engageable with said pinion, so as to be driven thereby during the rotation of the platen, for automatically actuating said silencing means when the rack has been moved a predetermined distance.

12. The combination, with a platen having a pinion on its axle, and driving means for said platen; of a master member for controlling the bringing into play of said driving means; silencing means for said driving means; a rack for automatically actuating said silencing means after having been driven a predetermined distance, said rack directly engageable with said pinion to be driven thereby during the rotation of the platen, but normally out of such engagement; and means for moving said rack into position for said engagement.

13. The combination, with a platen having a pinion on its axle, and driving means for said platen; of a master member for controlling the bringing into play of said driving means; silencing means for said driving means; a rack for automatically actuating said silencing means after having been driven a predetermined distance, said rack directly engageable with said pinion to be driven thereby during the rotation of the platen, but normally out of such engagement; and means controlled by said master member for moving said rack into position for said engagement.

14. The combination, with a platen having a pinion on its axle, and driving means for said platen; of a master member for controlling the bringing into play of said driving means; silencing means for said driving means; a rack for automatically actuating said silencing means after having been driven a predetermined distance, said rack directly engageable with said pinion to be driven thereby during the rotation of the platen, but normally out of such engagement; and means controlled by said master member for effecting the engagement of said rack and pinion substantially simultaneously with the bringing into play of said driving means.

15. The combination, with a platen, and driving means therefor; of a pneumatic actuator for bringing said driving means into action; a master member for governing the operation of said actuator; silencing means for said driving means; a separate pneumatic actuator for governing the operation of said silencing means; controlling means for bringing the second-named actuator into play; and means directly operated by said platen during its rotation for automatically actuating said controlling means after a predetermined rotation of the platen.

16. The combination, with a platen, and driving means therefor; of a pneumatic actuator for bringing said driving means into action; a master member for governing the operation of said actuator; silencing means for said driving means; a separate pneumatic actuator for governing the operation of said silencing means; a valve for admitting air to the second-named actuator to bring the same into play; and a member directly operated by said platen during its rotation, said member arranged to open said valve after having been driven a predetermined distance.

17. The combination, with a platen, and driving means therefor; of a master member for controlling the activity of said driving means; silencing means for said driving means; a pneumatic actuator for governing the operation of said silencing means having a normally-closed controlling valve; and a member adapted to be directly driven by said platen during its rotation; said valve arranged in the path of movement of said member so as to be struck and opened by said member when the latter has been driven a predetermined distance.

18. The combination, with a platen, and driving means therefor; of a master member for controlling the activity of said driving means; silencing means for said driving means; a pneumatic actuator for governing the operation of said silencing means having a normally-closed controlling valve; and an endwise-movable rack adapted to be directly driven by said platen during its rotation; said valve arranged in the path of movement of said rack so as to be struck and opened by said rack when the latter has been driven a predetermined distance.

19. The combination, with a platen, and driving means therefor; of a master member for controlling the activity of said driving means; silencing means for said driving means; and means adapted to be directly driven by said platen during its rotation, for automatically actuating said silencing means after having been driven a predetermined distance, the last-named means comprising a part which is adjustably mounted so as to vary the point at which such automatic actuation takes place.

20. The combination, with a platen, and driving means therefor; of a master member for controlling the activity of said driving means; silencing means for said driving means; and a multi-part member adapted to be directly driven by said platen during its rotation, for automatically actuating said silencing means after having been driven a predetermined distance, one part of said member being adjustably settable thereon so as to vary the point at which such automatic actuation takes place.

21. The combination, with a platen, and driving means therefor; of a master member for controlling the activity of said driving means; silencing means for said driving means; and a slotted member adapted to be directly driven by said platen during its rotation, for automatically actuating said silencing means after having been driven a predetermined distance, said member having a contact piece settable to different positions in said slot so as to vary the point at which such automatic actuation takes place.

22. The combination, with a platen, and driving means therefor; of a master member for controlling the activity of said driving means; silencing means for said driving means; a pivotally-mounted member adapted to be directly driven by said platen during its rotation, for automatically actuating said silencing means after having been driven a predetermined distance, said member being normally disposed in ineffective position with relation to said platen and having a slot through which its pivot projects; and means governed by the bringing into play of said driving means, for rocking said member about its pivot into effective position with relation to said platen.

23. The combination, with a platen having a pinion fixed to its axle, and driving means for said platen; of a master member for controlling the activity of said driving means; silencing means for said driving means; a pivotally-mounted rack adapted to mesh with said pinion so as to be driven thereby when the platen is rotated, for automatically actuating said silencing means after having been advanced a predetermined distance, said rack being normally out of mesh with said pinion and having a longitudinal slot through which its pivot projects; and means governed by the bringing into play of said driving means for rocking said rack about its pivot to bring it into mesh with said pinion.

24. The combination, with a platen, and driving means therefor; of a master member for controlling the activity of said driving means; silencing means for said driving means; a pneumatic actuator for governing the action of said silencing means having a normally-closed controlling valve associated therewith; a member adapted to be driven from said platen during its rotation; and a contact piece carried by said member arranged to strike against and open said valve after said member has been driven a predetermined distance, said member having a longitudinal slot wherein said contact piece is adjustably engaged to vary the point at which the opening of the valve takes place.

25. The combination, with a platen, and driving means therefor; of a master member for controlling the activity of said driving means; silencing means for said driving means; a pneumatic actuator for governing the action of said silencing means having a normally-closed controlling valve associated therewith; a member adapted to be driven from said platen during its rotation; and a contact piece carried by said member arranged to strike against and open said valve after said member has been driven a predetermined distance, said contact piece being adjustable longitudinally of said member to vary the point at which the opening of the valve takes place.

26. The combination, with a platen, and driving means therefor; of a master member for controlling the activity of said driving means; silencing means for said driving means; a member adapted to be directly driven by said platen during its rotation, but normally disconnected therefrom, for automatically actuating said silencing means after having been driven a predetermined distance; means operated consequent upon the bringing into play of said driving means for connecting said member with said platen; and means for automatically disconnecting said member from said platen after having been driven said distance.

27. The combination, with a platen, and driving means therefor; of a master member for controlling the activity of said driving means; silencing means for said driving means; a member adapted to be directly driven by said platen during its rotation, but normally disconnected therefrom, for automatically actuating said silencing means after having been driven a predetermined distance; means operated consequent upon the bringing into play of said driving means for connecting said member with said platen, and a spring for automatically disconnecting said member from said platen after having been driven said distance.

28. The combination, with a platen, and driving means therefor; of a master member for controlling the activity of said driving means; silencing means for said driving means; a pivotally-mounted member adapted to be driven by said platen during its rotation, but normally disconnected therefrom, for automatically actuating said silencing means after having been driven a predetermined distance; means operated consequent upon the bringing into play of said driving means, for rocking said member in one direction about its pivot to connect it with said platen; and means for automatically rocking said member in the other direction about its pivot after having been driven said distance, to disconnect it from said platen.

29. The combination, with a platen having a pinion fixed to its axle, and driving means for said platen; of a master member for controlling the activity of said driving means; silencing means for said driving means; a pivotally-mounted rack adapted to mesh with said pinion so as to be driven thereby when the platen is rotated, for automatically actuating said silencing means after having been advanced a predetermined distance, said rack being normally out of mesh with said pinion; means operated consequent upon the bringing into play of said driving means, for rocking said rack in one direction about its pivot to engage it with said pinion; and means for automatically rocking said rack in the other direction about its pivot after having been driven said distance, to unmesh it from said platen.

30. The combination, with a typewriting machine, comprising a carriage, and traversing means therefor; of tabulating mechanism for said carriage; a master member; feeding means for said master member; means controlled by said master member for actuating said tabulating mechanism; and means operated automatically consequent upon the actuation of said tabulating mechanism for disconnecting said feeding means.

31. The combination, with a typewriting machine, comprising a carriage, and traversing means therefor; of tabulating mechanism for said carriage, including a tabulator key; a master member; feeding means for said master member; an actuator controlled by said master member and connected with said key to operate the same; silencing means for said feeding means; and connections between said actuator and said silencing means, for operating the latter concomitantly with the operation of said key.

32. The combination, with a typewriting machine, comprising a carriage and traversing means therefor; of tabulating mechanism for said carriage, including a tabulator key; a master member; feeding means for said master member; an actuator controlled by said master member and connected with said key to operate the same; a bar connected to throw said feeding means out of action; and connections between said actuator and said bar for operating the latter from the former.

33. The combination, with a typewriting machine, comprising a carriage, and traversing means therefor; of tabulating mechanism for said carriage, including a tabulator key; a master member; feeding means for said master member; an actuator controlled by said master member; a plunger connected to be operated by said actuator; silencing means for said feeding means; and connections between said plunger and said key and silencing means, for simultaneously operating said key and said silencing means when said plunger is operated.

34. The combination, with a typewriting machine, comprising a carriage, and traversing means therefor; of tabulating mechanism for said carriage, including a tabulator key; a master member; feeding means for said master member; an actuator controlled by said master member; a plunger connected to be operated by said actuator; a bar connected to throw said feeding means out of action; and connections between said plunger and said bar and said key, for simultaneously operating said bar and said key when said plunger is operated.

35. The combination, with a typewriting machine, comprising type-operating keys, a carriage, and traversing means therefor; of tabulating mechanism for said carriage; a master member for controlling the operation of said keys; feeding means for said master member; and means for disconnecting said feeding means during tabulating runs of said carriage.

36. The combination, with a typewriting machine, comprising type-operating keys, a carriage, and traversing means therefor; of tabulating mechanism for said carriage; a master member for controlling the operation of both said keys and said tabulating mechanism; feeding means for said master member; and means for automatically disconnecting said feeding means consequent upon the bringing of said tabulating mechanism into action.

37. The combination, with a typewriting machine, comprising a carriage, and traversing means therefor; of tabulating mechanism for said carriage; a master member for controlling said tabulating mechanism; feeding means for said master member; automatically-operated means for disconnecting said feeding means during tabulating runs of the carriage; and automatically-operated means for re-connecting said feeding means at the conclusion of each such run.

38. The combination, with a typewriting machine, comprising a carriage, and traversing means therefor; of tabulating mechanism for said carriage; a master member for controlling said tabulating mechanism; feeding means for said master member; automatically-operated means for disconnecting said feeding means during tabulating runs of the carriage; an actuator for re-connecting said feeding means, said actuator having a movable controlling device; and means for automatically operating said controlling device at the conclusion of each such run.

39. The combination, with a typewriting machine, comprising a carriage, and traversing means therefor; of tabulating mechanism for said carriage; a master member for controlling said tabulating mechanism; feeding means for said master member; automatically-operated means for disconnecting said feeding means during tabulating runs of the carriage; an actuator for re-connecting said feeding means, said actuator having a movable controlling device; and means operated automatically by said carriage at the conclusion of each such run for operating said controlling device.

40. The combination, with a typewriting machine, comprising a carriage, and traversing means therefor; of tabulating mechanism for said carriage; a master member for controlling said tabulating mechanism; feeding means for said master member; automatically-operated means for disconnecting said feeding means during tabulating runs of the carriage; a pneumatic actuator for re-connecting said feeding means having a normally-closed controlling valve; and means for automatically opening said valve at the conclusion of each such run.

41. The combination, with a typewriting machine, comprising a carriage, and traversing means therefor; of tabulating mechanism comprising a stop mounted on the carriage and a coöperating, stop-carrying frame movably mounted on the machine frame; a master member for controlling said tabulating mechanism; feeding means for said master member; means for automatically disconnecting said feeding means during tabulating runs of the carriage; and re-connecting means for said feeding means operated by said stop-carrying frame at the conclusion of each such run.

42. The combination, with a typewriting machine, comprising a carriage, and traversing means therefor; of tabulating mechanism comprising a stop mounted on the carriage and a coöperating, stop-carrying frame movably mounted on the machine frame; a master member for controlling said tabulating mechanism; feeding means for said master member; means for automatically disconnecting said feeding means during tabulating runs of the carriage; re-connecting means for said feeding means; an actuator for said re-connecting means having a movable controlling device associated with it for throwing it into play; and means on said stop-carrying frame for operating said controlling device at the conclusion of each such run.

43. The combination, with a typewriting machine, comprising a carriage, and traversing means therefor; of tabulating mechanism comprising a stop mounted on the carriage and a coöperating, stop-carrying frame movably mounted on the machine frame; a master member for controlling said tabulating mechanism; feeding means for said master member; means for automatically disconnecting said feeding means during tabulating runs of the carriage; re-connecting means for said feeding means; a pneumatic actuator for said re-connecting means having a normally-closed controlling valve associated with it; and means on said stop-carrying frame for opening said valve at the conclusion of each such run, to excite said actuator to action.

44. The combination with a typewriting machine, comprising type-operating keys, a platen, and mechanism, including a rock shaft, for shifting a bichrome ribbon to expose either field thereof to the action of the types; of a master member for controlling the actuation of said keys; feeding means for said master member; an actuator controlled by said master member; and a connecting train between said actuator and said rock shaft for rocking the latter first in one direction and then in the other at successive operations of the actuator; said train comprising a rock shaft connected with the first-named rock shaft, a cross-piece secured to the second-named rock shaft, and a member movable by said actuator and arranged to operatively engage the opposite ends of said cross-piece in alternation.

45. The combination, with a typewriting machine, comprising type-operating keys, a platen, and mechanism, including a rock shaft, for shifting a bichrome ribbon to expose either field thereof to the action of the types; of a master member for controlling the actuation of said keys; feeding means for said master member; an actuator controlled by said master member; and a connecting train between said actuator and said rock shaft for rocking the latter first in one direction and then in the other at successive operations of the actuator; said train comprising a rock shaft connected with the first-named rock shaft, a cross-piece secured to the second-named rock shaft, and a member movable by said actuator and having a pair of diverging arms arranged to operatively engage the opposite ends of said cross-piece in alternation.

LYMAN R. ROBERTS.

Witnesses:
ARTHUR A. JOHNSON,
EDITH B. LIBBEY.